(12) United States Patent
Zhou et al.

(10) Patent No.: US 8,768,401 B2
(45) Date of Patent: Jul. 1, 2014

(54) METHOD, APPARATUS, AND NETWORK DEVICE FOR POWER CONTROL

(75) Inventors: Mingyu Zhou, Beijing (CN); Lei Wan, Beijing (CN); Yajun Zhao, Shenzhen (CN); Xiaotao Ren, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 13/235,117

(22) Filed: Sep. 16, 2011

(65) Prior Publication Data

US 2012/0004007 A1     Jan. 5, 2012

Related U.S. Application Data

(63) Continuation of application No. PCT/CN2009/070803, filed on Mar. 16, 2009.

(51) Int. Cl.
*H04B 7/00*      (2006.01)
*H04B 15/00*     (2006.01)
*H04B 17/00*     (2006.01)

(52) U.S. Cl.
USPC .......... 455/522; 455/69; 455/127.1; 455/63.1

(58) Field of Classification Search
USPC ............... 455/522, 69, 127.1, 67.11, 63.1
See application file for complete search history.

(56) References Cited

U.S. PATENT DOCUMENTS

| | | | |
|---|---|---|---|
| 6,587,697 B2 | 7/2003 | Terry et al. | |
| 7,292,856 B2 | 11/2007 | Julian et al. | |
| 7,433,460 B2 * | 10/2008 | Budka et al. | 379/332 |
| 7,738,907 B2 | 6/2010 | Xiao et al. | |
| 8,311,570 B2 * | 11/2012 | Richardson | 455/522 |
| 8,483,742 B2 * | 7/2013 | Kim et al. | 455/522 |
| 2004/0218567 A1 * | 11/2004 | Budka et al. | 370/332 |
| 2005/0176686 A1 | 8/2005 | Maurer et al. | |
| 2006/0040697 A1 | 2/2006 | Komatsu | |
| 2007/0010253 A1 | 1/2007 | Gunnarsson et al. | |
| 2007/0189230 A1 | 8/2007 | Lee | |
| 2007/0293260 A1 | 12/2007 | Xiao et al. | |
| 2008/0123595 A1 | 5/2008 | Lindheimer et al. | |
| 2008/0200202 A1 | 8/2008 | Montojo et al. | |
| 2009/0069017 A1 | 3/2009 | Usuda et al. | |
| 2009/0286545 A1 * | 11/2009 | Yavuz et al. | 455/452.1 |

FOREIGN PATENT DOCUMENTS

CN     1371220 A     9/2002

(Continued)

OTHER PUBLICATIONS

NXP Semiconductors, RI-083775, "Unitary Beamforming for MU-MIMO With Per Antenna Power Constraint for LTE-A," 3GPP TSG RAN WGI Meeting #54bis, Agenda Item 12, Sep. 29 to Oct. 3, 2008 pp. 1-7, Prague, Czech Republic.

3GPP TS 36.213 v8.6.0, 3rd Generation Partnership Project; Technical Specification Group Radio Access Network; Evolved Universal Terrestrial Radio Acess (E-UTRA); Physical Layer Procedures (Release 8), Mar. 2009, 77 pages.

(Continued)

*Primary Examiner* — Tilahun B Gesesse
(74) *Attorney, Agent, or Firm* — Slater & Matsil, L.L.P.

(57) ABSTRACT

A method for power control includes: if a downlink serving Access Point (AP) of a User Equipment (UE) is different from an uplink serving AP of the UE, sending, by a base station, downlink signaling to the UE so that the UE adjusts uplink transmitting power according to the downlink signaling. In addition, the present invention discloses an apparatus and a network device for power control.

9 Claims, 4 Drawing Sheets

(56) References Cited

FOREIGN PATENT DOCUMENTS

| CN | 1437415 A | 8/2003 |
| CN | 1509579 A | 6/2004 |
| CN | 1185888 C | 1/2005 |
| CN | 1748403 A | 3/2006 |
| CN | 101057420 A | 10/2007 |
| CN | 101202575 A | 6/2008 |
| CN | 100450195 C | 1/2009 |
| CN | 101729102 A | 6/2010 |
| WO | WO 03/096572 A2 | 11/2003 |
| WO | WO 2007/149616 A2 | 12/2007 |
| WO | WO 2008/100954 A2 | 8/2008 |

OTHER PUBLICATIONS

Written Opinion of the International Searching Authority, PCT Application No. PCT/CN2009/070803, Applicant: Huawei Technologies Co., LTD., et al., Mailing date: Dec. 24, 2009, 6 pages.

International Search Report, International Application No. PCT/CN2009/070803, Applicant: Huawei Technologies Co., LTD., Mailing date: Dec. 24, 2009, 10 pages.

Extended European Search Report, European Application No. 09841683.7-1246, Applicant: Huawei Technologies Co., LTD., Dated: Mar. 11, 2011, 12 pages.

\* cited by examiner

METHOD, APPARATUS, AND NETWORK DEVICE FOR POWER CONTROL

This application is a continuation of International Application No. PCT/CN2009/070803, filed on Mar. 16, 2009, which is hereby incorporated by reference in its entirety.

TECHNICAL FIELD

The present invention relates to the field of communications technologies, and in particular, to a method, an apparatus, and a network device for power control.

BACKGROUND

In an existing Long Time Evolution (Long Time Evolution, LTE) system, generally a User Equipment (User Equipment, UE) communicates with only one Access Point (Access Point, AP) in an uplink direction (that is, the UE sends a signal to the AP) and in a downlink direction (that is, the AP sends signals to the UE), where the AP is called a serving AP, and an uplink serving AP and a downlink serving AP is the same AP. The AP is a node including at least a radio frequency transceiver and may be equipped with one or multiple antenna elements; multiple APs may be distributed or centralized geographically and connected to an eNodeB over a wired or wireless connection; or the AP and eNodeB may be the same physical entity. The relationship between an AP and a cell may be: A cell includes one AP, or a cell include multiple APs. For ease of description, the following assumes that a cell includes one AP. In such a system, the uplink transmitting power of the UE(User Equipment) may be based on downlink signaling of the base station eNodeB and/or the measurement result of a radio channel measured by the UE. For example, the transmitting power of a Physical Uplink Share Channel (Physical Uplink Share Channel, PUSCH) of the UE is decided by multiple factors, which include: downlink Path Loss (abbreviated to PL) measured by the UE, cell-specific power adjustment $P_{O\_NORMINAL\_PUSCH}(j)$ sent by the AP to the UE, and UE-specific power adjustment $P_{O\_UE\_PUSCH}(j)$ sent by the AP to the UE. Therefore, the UE receives the downlink signaling sent by the serving AP to obtain $P_{O\_NORMINAL\_PUSCH}(j)$ and $P_{O\_UE\_PUSCH}(j)$, measures the downlink signal sent by the serving AP to obtain the PL, and calculate the uplink transmitting power value considering other parameters.

In the process of implementing the present invention, the inventor finds that: In the communication system, the introduction of multiple technologies, such as Coordinated Multi-Point transmission (CoMP), different uplink and downlink serving cells, and relay transmission, brings forth a new scenario. For example, the CoMP technology is an important way to improve the overall performance of a cell and the performance of the cell serving a UE at the cell edge, and multiple APs may coordinate in transmitting and receiving data from the UE (the APs may be connected to the same eNodeB or to different base stations) and therefore a new scenario may be introduced, that is, the uplink and downlink serving APs may be the same or different. If the existing uplink power control algorithm is applied directly, a certain problem may occur during uplink power control. Specifically, among parameters of the uplink power control formula, the cell-specific parameters (such as the $P_{O\_NORMINAL\_PUSCH}(j)$ value) and UE-specific parameters (such as the $P_{O\_UE\_PUSCH}(j)$ value) are obtained by the UE from an AP that sends downlink signaling; if the AP is different from the uplink serving AP of the UE, the uplink signal power obtained according to the parameters does not match the power expected by the uplink serving AP. In addition, among the parameters of the uplink power control formula, the PL is obtained by the UE by measuring downlink signals of an AP; if the AP is different from the uplink serving AP of the UE, the uplink signal power obtained according to the PL parameter does not match the power expected by the uplink serving AP.

SUMMARY OF THE INVENTION

Embodiments of the present invention provide a method, an apparatus, and a network device for power control to ensure normal uplink transmission through corresponding processing when an AP that sends downlink signaling to a UE is different from an uplink serving AP of the UE.

Embodiments of the present invention provide the following technical solutions:

An embodiment of the present invention provides a method for power control, including:

if a downlink serving AP of a UE is different from an uplink serving AP of the UE, sending, by a base station, downlink signaling to the UE so that the UE adjusts uplink transmitting power according to the downlink signaling.

An embodiment of the present invention further provides an apparatus for power control, including:

a judging unit, configured to judge whether a downlink serving AP of a UE and an uplink serving AP of the UE is the same AP; and a sending unit, configured to send downlink signaling to the UE when the judging unit determines that the downlink serving AP of the UE is different from the uplink serving AP of the UE, so that the UE adjusts uplink transmitting power according to the downlink signaling.

An embodiment of the present invention further provides a UE, including:

a first receiving unit, configured to receive a PL measurement indicator and a parameter sent by a base station;

a measuring unit, configured to measure a PL between the UE and at least one uplink serving AP of the UE according to the PL measurement indicator received by the first receiving unit;

a second calculating unit, configured to calculate an uplink transmitting power adjustment value according to the measured PL and the parameters obtained from the base station; and a first adjusting unit, configured to adjust uplink transmitting power according to the uplink transmitting power adjustment value calculated by the second calculating unit.

An embodiment of the present invention further provides a UE, including:

a presetting unit, configured to bind change information of a serving AP of the UE to a range of an uplink power control parameters of the UE beforehand;

a second receiving unit, configured to receive the change information of the serving AP of the UE and downlink signaling carrying information that indicates an uplink transmitting power adjustment sent by a base station;

a modifying unit, configured to modify the range of the uplink power control parameter according to the change information; and a second adjusting unit, configured to adjust uplink transmitting power according to the uplink transmitting power adjustment value and the current range of the uplink power control parameter.

By using the method, apparatus, and network device for power control provided by embodiments of the present invention, when the AP that sends downlink signaling to the UE is different from the uplink serving AP of the UE, corresponding processing is performed to ensure that the calculated uplink transmitting power matches the expected uplink transmitting power for uplink transmission, therefore normal uplink transmission is ensured.

DETAILED DESCRIPTION OF ILLUSTRATIVE EMBODIMENTS

Figure 1:
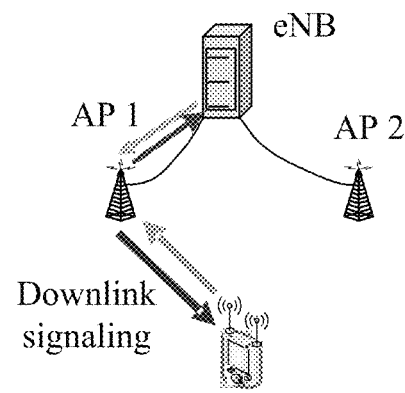
FIG. 1 is a schematic diagram of situation 1 of scenario 1 according to a first embodiment of the present invention.

Embodiments of the present invention provide a method, an apparatus, and a network device for power control to ensure normal uplink transmission through corresponding processing when an AP that sends downlink signaling to a UE is different from an uplink serving AP of the UE. To better explain the purpose, technical solutions, and advantages of the present invention, the following describes embodiments of the present invention in detail with reference to the accompanying drawings. It should be noted that an LTE system is taken as an example and is not construed as a limitation on the present invention. Those skilled in the art may understand that the present invention may also be applied in other systems or networks. The serving AP in embodiments of the present invention includes an uplink serving AP and a downlink serving AP.

Embodiment 1

When an AP that sends downlink signaling to a UE is different from an uplink serving AP of the UE, an eNodeB obtains parameter of one or some or all uplink serving APs, where the parameter include at least one of the following parameters:

1. PL between the uplink serving AP and the UE measured by the uplink serving AP, where the PL may be obtained by the uplink serving AP detecting an uplink signal sent by the UE and perform calculating;

2. a cell-specific parameter of the uplink serving AP, for example, $P_{O\_NORMINAL\_PUSCH(j)}$ indicating an expected received power value, parameter $\alpha(j)$ indicating control of interference to other cells, and parameter Ks indicating whether to adjust power according to a MCS in an LTE system; and 3. a UE-specific parameter determined by the uplink serving AP. It should be noted that the uplink serving AP determines the parameters according to its own scheduling and resources; the UE-specific means that parameters may be different for different UEs, because the parameters are determined by the eNodeB or AP according to the scheduling and resources of the eNodeB or AP. An example of such parameters is $P_{O\_UE\_PUSCH(j)}$ indicating that the UE is expected to control interference to other cells in the LTE system.

Then the eNodeB calculates an uplink transmitting power adjustment value of the UE according to the obtained parameters, and transfers the uplink transmitting power adjustment value to the UE through downlink signaling; after receiving the downlink signaling, the UE performs mapping according to a corresponding way, and adjusts the uplink power after obtaining the uplink transmitting power adjustment value.

The eNodeB calculates the uplink transmitting power adjustment value according to the obtained parameters, which may be one of the corresponding parameters obtained from all uplink serving APs, or be the maximum value, or minimum value, or average value of the corresponding parameters obtained from all uplink serving APs.

The above process may be performed when the uplink and/or downlink serving AP of the UE changes. The eNodeB may obtain the parameters of the uplink serving AP through various connections between the eNodeB and the AP such as a fiber connection; when the uplink serving AP of the UE is connected to different eNodeBs, the parameters may also be transferred through connections between eNodeBs, for example, transferred through an X2 interface.

In addition, the relationship between the uplink transmitting power adjustment value and the downlink signaling may be as follows: The downlink signaling may directly include the power adjustment value information, or the power adjustment value information is included implicitly in other downlink signaling and transferred to the UE, that is, higher layer signaling (for example, the higher layer signaling in the LTE system) or power control signaling in the prior art may be used. The signaling may be transferred to the UE through a broadcast channel or a downlink control channel.

In addition, the eNodeB may transfer the downlink signaling to the UE directly, or the eNodeB first transfers the signaling to the AP and then the signaling is transferred to the UE through the AP.

For ease of description, the following describes a situation where an eNodeB is connected to two APs and a UE is served by at most two APs as an example.

Scenario 1: The uplink serving AP and the downlink serving AP is the same AP.

Figure 2:
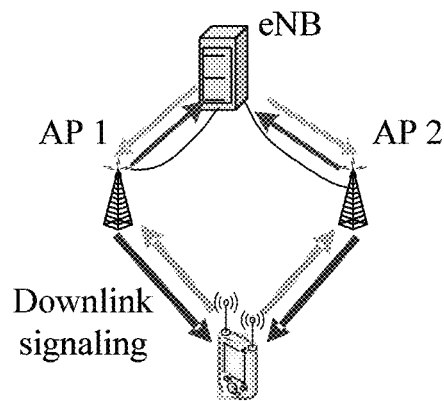
FIG. 2 is a schematic diagram of situation 2 of scenario 1 according to the first embodiment of the present invention.

The eNodeB is connected to AP 1 and AP 2, and the uplink and downlink serving APs of the UE are the same AP. FIG. 1 shows a situation where only AP 1 serves the UE, and in this case, good performance can be achieved by the prior art. FIG. 2 shows a situation where both AP 1 and AP 2 serve the UE, and in this case, if the prior art is used, that is, the UE receives downlink signaling from only AP 1, marked as "downlink signaling" (including power control information $P_{O\_NORMINAL\_PUSCH}(j)$ and $P_{O\_UE\_PUSCH}(j)$ information of AP 1) in FIG. 1B, and detects only the PL from AP 1 to the UE to calculate the uplink transmitting power of the UE, the uplink signal sent by the UE arrives at AP 1 at the power expected by AP 1; however, because the power control information of AP 1 differs from the power control information of AP 2 and the PL from the UE to AP 1 also differs from the PL from the UE to AP 2, the uplink transmitting power of the UE sending the uplink signal to AP 2 is too high or too low. Therefore, the prior art cannot work normally in this scenario. The technical solutions of the present invention may be implemented well, and specifically, the following steps may be performed:

1. AP 1 detects uplink PL between AP 1 and the UE, and AP 2 detects uplink PL between AP 2 and the UE, respectively.

2. AP 1 transfers the uplink PL between AP 1 and the UE and parameters related to uplink power control to the eNodeB, and AP 2 transfers the uplink PL between AP 2 and the UE and parameters related to uplink power control to the eNodeB, where the parameters related to the power control may include at least one of the following content:

(1) expected received power value of the signal of the UE that AP 1 and AP 2 receive, where the value includes at least one of a cell-specific parameter and a UE-specific parameter but is not limited to the above parameter, or is the value obtained by calculating through using the cell-specific parameter and the UE-specific parameter, namely, functions of these parameters, and the present invention does not limit the calculation method;

(2) compensation coefficient for compensating for the PLs when AP 1 and AP 2 expect the UE to perform power control, where the value may be a real number in the range of 0-1, and the value 1 indicates complete compensation for the PLs; and (3) whether to consider an MCS to adjust uplink transmitting power when AP 1 and AP 2 expect the UE to perform power control. For different cells, when Ks is set to different values, adjustments of uplink transmitting power are different. For example, for cell 1, if $K_S=0$, it indicates that uplink transmitting power is not adjusted; for cell 2, if $K_S=1.25$, it indicates that the adjustment of uplink transmitting power is $10 \log_{10}(2^{MPR(i) \cdot KS} - 1)$, where MPR indicates the number of bits transmitted per symbol when an MCS is used. Therefore, when AP 1 and AP 2 expect the UE to perform power control, uplink transmitting power may be adjusted according to different Ks values (for example, the function of different Ks values) of cell 1 and cell 2.

3. After receiving the parameter information, the eNodeB may determine power control parameter of the UE according to the parameters of AP 1 and AP 2, for example:

(1) obtain the average value of the expected received power values of the uplink signal that AP 1 and AP 2 receive, and use the obtained average value as the power control parameter;

(2) obtain the average value of compensations for the PLs when AP 1 and AP 2 expect the UE to perform power control, and use the obtained average value as the power control parameter; and (3) if either AP 1 or AP 2 expects the UE to adjust transmitting power by considering the MCS, determine that the UE adjusts transmitting power by considering the MCS, and generate corresponding parameter information, where the method of adjusting transmitting power by considering the MCS is already described above and not further described here.

4. The eNodeB sends the above parameters to the UE through downlink signaling.

5. After receiving the downlink signaling, the UE parses the signaling and adjusts the uplink transmitting power according to the parsing result.

Scenario 2: The Uplink Serving AP is Different from the Downlink Serving AP.

The eNodeB is connected to AP 1 and AP 2; because the transmitting power and antenna configuration of the APs are different, and uplink/downlink channel fading between the UE and the APs is varied, the uplink serving AP may be different from the downlink serving AP. For example, the transmitting power of an AP is higher than that of the UE, and therefore, the signal sent by the AP can be recovered normally by the UE but the signal sent by the UE cannot be recovered normally by the AP; in this case, the downlink serving AP of the UE may be more than the uplink serving AP of the UE.

Further, the situation may cause the AP that sends downlink signaling to the UE to be different from the uplink serving AP of the UE.

Figure 3:
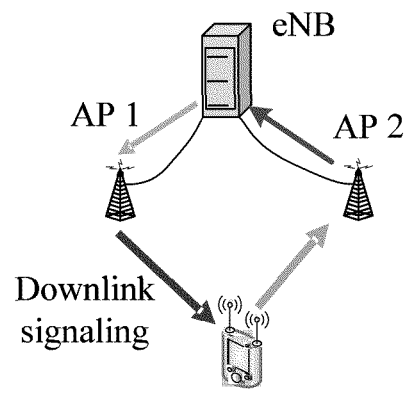
FIG. 3 is a schematic diagram of situation 1 of scenario 2 according to the first embodiment of the present invention.

Scenario 2 shows three of the situations. In FIG. 3, the downlink serving AP of the UE is AP 1; in this case, if the prior art is used, and the UE receives downlink signaling (including power control information $P_{O\_NORMINAL\_PUSCH}(j)$ and $P_{O\_UE\_PUSCH}(j)$ information of AP 1) from AP 1, and detects only the PL from AP 1 to the UE, however, the uplink serving AP is AP 2, because the power control information of AP 1 differs from the power control information of AP 2 and the PL of AP 1 also differs from the PL of AP 2, the uplink transmitting power of the UE sending the uplink signal to AP 2 is too high or too low. The technical solutions of the present invention may be implemented well, and specifically, the following steps may be performed:

1. AP 2 detects the uplink PL to the UE.

2. AP 2 transfers the PL and parameters related to uplink power control to the eNodeB, where the parameters related to the power control may include at least one of the following content:

(1) expected received power value of the signal of the UE that AP 2 receive, where the value includes at least one of a cell-specific parameter and a UE-specific parameter but is not limited to the parameters, or is the value obtained by calculating through using the cell-specific parameters and the UE-specific parameters, namely, functions of these parameters, and the present invention does not limit the calculation method;

(2) compensation coefficient for compensating for the PL when AP 2 expects the UE to perform power control, where the value may be a real number in the range of 0-1, and the value 1 indicates complete compensation for the PL; and (3) whether to consider an MCS to adjust uplink transmitting power when AP 2 expects the UE to perform power control. For different cells, when Ks is set to different values, adjustments of uplink transmitting power are different. For example, for cell 1, if $K_S=0$, it indicates that uplink transmitting power is not adjusted; for cell 2, if $K_S=1.25$, it indicates that the adjustment of uplink transmitting power is $10 \log_{10}(2^{MPR(i) \cdot KS} - 1)$, where MPR indicates the number of bits transmitted per symbol when an MCS is used. Therefore, when AP 1 and AP 2 expect the UE to perform power control, uplink transmitting power may be adjusted according to different Ks values (for example, the function of different Ks values) of cell 1 and cell 2.

3. After receiving the information, the eNodeB may determine uplink power control parameter of the UE according to the parameters included in the information.

4. The eNodeB sends the above parameters to the UE through downlink signaling.

5. After receiving the downlink signaling, the UE parses the signaling and adjusts the uplink transmitting power according to the parsing result.

Figure 4:
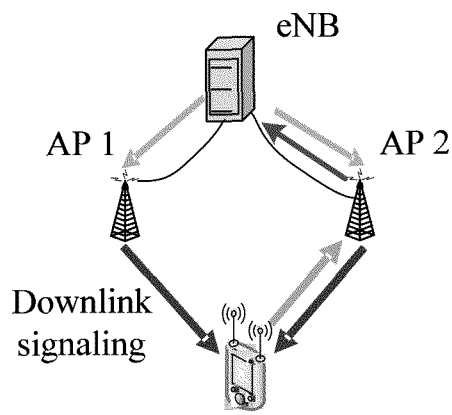
FIG. 4 is a schematic diagram of situation 2 of scenario 2 according to the first embodiment of the present invention.

In FIG. 4, the downlink serving APs of the UE are AP 1 and AP 2, and the uplink serving AP is AP 2; in this case, if the prior art is used, that is, the UE receives downlink signaling from AP 1, and detects only the PL from AP 1 to the UE, due to the same cause, the uplink transmitting power of the UE sending the uplink signal to AP 2 is too high or too low. The technical solutions of the present invention may be implemented well, and specifically, the following steps may be performed:

1. AP 2 detects the uplink PL to the UE.

2. AP 2 transfers the PL and parameters related to uplink power control to the eNodeB, where the parameters related to the power control may include at least one of the following contents:

(1) expected received power value of the signal of the UE that AP 2 receive, where the value includes at least one of a cell-specific parameters and a UE-specific parameters but is not limited to the parameters, or is the value obtained by calculating through using the cell-specific parameters and the UE-specific parameters, namely, functions of these parameters, and the present invention does not limit the calculation method;

(2) compensation coefficient for compensating for the PL when AP 2 expects the UE to perform power control, where the value may be a real number in the range of 0-1, and the value 1 indicates complete compensation for the PL; and (3) whether to consider an MCS to adjust uplink transmitting power when AP 2 expects the UE to perform power control. For different cells, when Ks is set to different values, adjustments of uplink transmitting power are different. For example, for cell 1, if $K_S=0$, it indicates that uplink transmitting power is not adjusted; for cell 2, if $K_S=1.25$, it indicates that the adjustment of uplink transmitting power is $10 \log_{10}(2^{MPR(i) \cdot KS}-1)$, where MPR indicates the number of bits transmitted per symbol when an MCS is used. Therefore, when AP 1 and AP 2 expect the UE to perform power control, uplink transmitting power may be adjusted according to different Ks values (for example, the function of different Ks values) of cell 1 and cell 2.

3. After receiving the information, the eNodeB may determine uplink power control parameters of the UE according to the parameters of AP 2.

4. The eNodeB sends the parameters to the UE through downlink signaling.

5. After receiving the downlink signaling, the UE parses the signaling and adjusts the uplink transmitting power according to the parsing result.

Figure 5:
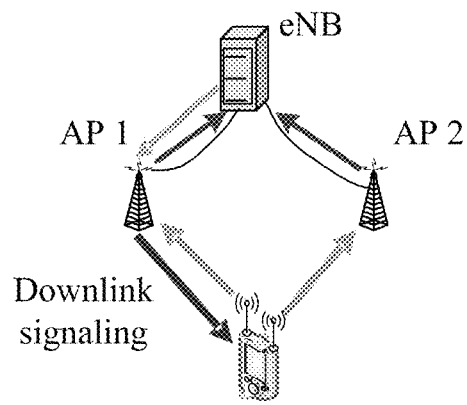
FIG. 5 is a schematic diagram of situation 3 of scenario 2 according to the first embodiment of the present invention.

In FIG. 5, the downlink serving AP of the UE is only AP 1, and downlink signaling is sent to the UE through AP 1, but the uplink serving APs are AP 1 and AP 2; in this case, uplink power control may be performed according to the following steps:

1. AP 1 and AP 2 detect uplink PLs to the UE.

2. AP 1 and AP 2 transfer the PLs and parameters related to uplink power control to the eNodeB, where the parameters related to the power control may include at least one of the following contents:

(1) expected received power value of the signal of the UE that AP 1 and AP 2 receive, where the value includes at least one of a cell-specific parameters and a UE-specific parameters but is not limited to the parameters, or is the value obtained by calculating through using the cell-specific parameters and the UE-specific parameters, namely, functions of these parameters, and the present invention does not limit the calculation method;

(2) compensation coefficient for compensating for the PLs when AP 1 and AP 2 expect the UE to perform power control, where the value may be a real number in the range of 0-1, and the value 1 indicates complete compensation for the PLs; and (3) whether to consider an MCS to adjust uplink transmitting power when AP 1 and AP 2 expect the UE to perform power control. For different cells, when Ks is set to different values, adjustments of uplink transmitting power are different. For example, for cell 1, if $K_S=0$, it indicates that uplink transmitting power is not adjusted; for cell 2, if $K_S=1.25$, it indicates that the adjustment of uplink transmitting power is $10 \log_{10}(2^{MPR(i) \cdot KS}-1)$, where MPR indicates the number of bits transmitted per symbol when an MCS is used. Therefore, when AP 1 and AP 2 expect the UE to perform power control, uplink transmitting power may be adjusted according to different Ks values (for example, the function of different Ks values) of cell 1 and cell 2.

3. After receiving the parameter information, the eNodeB may determine uplink power control parameters of the UE according to the parameters of AP 1 and AP 2, for example:

(1) obtain the average value of the expected received power values of the uplink signal that AP 1 and AP 2 receive, and use the obtained average value as the power control parameter;

(2) obtain the average value of compensations for the PLs when AP 1 and AP 2 expect the UE to perform power control, and use the obtained average value as the power control parameter; and (3) if either AP 1 or AP 2 expects the UE to adjust transmitting power by considering the MCS, determine that the UE adjusts transmitting power by considering the MCS, and generate corresponding parameter information.

4. The eNodeB sends the parameters to the UE through downlink signaling.

5. After receiving the downlink signaling, the UE maps the signaling and adjusts the uplink transmitting power according to the mapping result.

In the first embodiment of the present invention, when the AP that sends downlink signaling to the UE is different from the uplink serving AP of the UE, corresponding processing is performed to ensure that the calculated uplink transmitting power matches the expected uplink transmitting power for uplink transmission, therefore normal uplink transmission is ensured.

Embodiment 2

In the second embodiment of the present invention, special processing is performed on the adjustment of a PL on the basis of the first embodiment. That is, when an AP that sends downlink signaling to a UE is different from an uplink serving AP of the UE, the eNodeB may also notify the UE through downlink signaling (PL measurement indicator) to detect PLs of one or some or all uplink serving APs. After receiving the signaling, the UE detects the PL of the uplink serving AP and applies the PL in uplink power control. For example, if the eNodeB notifies the UE to detect the PL of an AP, the UE detects the PL and then calculates transmitting power according to the compensation coefficient notified by the eNodeB; if the eNodeB notifies the UE to detect the PLs of multiple APs, the UE may detect multiple PLs, and then calculate the transmitting power according to the compensation coefficient notified by the eNodeB. The present invention does not limit the calculation method. For a cell-specific parameter of an uplink serving AP and a UE-specific parameter determined by the uplink serving AP, for example, $P_{O\_UE\_PUSCH}(j)$ indicating that the UE is expected to control interference to other cells in an LTE system, see the process in the first embodiment. Details are not described here.

The downlink signaling may include an ID of the uplink serving AP or information indicating the ID of the uplink serving AP. According to the ID of the uplink serving AP or the information indicating the ID of the uplink serving AP, the UE may know a downlink signal sent by the serving AP so as to parse the downlink signaling; or detect the downlink signal to obtain an uplink PL.

In the second embodiment of the present invention, when the AP that sends downlink signaling to the UE is different from the uplink serving AP of the UE, corresponding processing is performed to ensure that the calculated uplink transmitting power matches the expected uplink transmitting power for uplink transmission, therefore normal uplink transmission is ensured.

Embodiment 3

In this embodiment, change information of a serving AP of a UE is bound to a range of value of a uplink power control parameter on the basis of the first embodiment. That is, when an uplink and/or downlink serving AP of the UE changes, an eNodeB may notify the UE of the change information of the serving AP through downlink signaling; the eNodeB may also send downlink power control signaling to the UE. After receiving the change information of the serving AP, the UE maps the change information to a modification of the range of the uplink power control parameter carried in the downlink signaling; after the UE receives the downlink power control signaling, the UE parses the downlink power control signaling according to a new range of value of the power control parameter and therefore adjusts the uplink power.

For example, when the uplink serving AP does not change, the range of uplink power control parameter is [−A, B], where −A indicates the minimum value of a power adjustment and B indicates the maximum value of the power adjustment and the unit may be dB. The range of the value of uplink power control parameter may also be actual values. For example, in an LTE system, the range of DCI format 3 is [−1, 0, 1, 3] dB, indicating one of the four power adjustments may be selected. When the number of the uplink serving AP increases, the eNodeB notifies the UE through the downlink signaling, and after the UE knows that the number of the uplink serving AP increases, the UE maps the range of value of uplink power control parameter to [−C, D] according to the increase of the uplink serving AP. When the number of the uplink serving AP decreases, the eNodeB notifies the UE through the downlink signaling, and after the UE knows that the number of the uplink serving AP decreases, the UE maps the range of value of uplink power control parameter to [−E, F] according to the decrease of the uplink serving AP. After receiving the downlink power control signaling, the UE may map the downlink power control signaling according to a new range of value of uplink power control parameter to adjust the uplink power.

In the third embodiment of the present invention, when the AP that sends downlink signaling to the UE is different from the uplink serving AP of the UE, corresponding processing is performed to ensure that the calculated uplink transmitting power matches the expected uplink transmitting power for uplink transmission, therefore normal uplink transmission is ensured.

Embodiment 4

When an uplink and/or downlink serving AP of a UE changes, an eNodeB may notify the UE with priority that the uplink serving AP changes; after receiving the information, the UE may adjust uplink transmitting power automatically. For example, when the number of the uplink serving AP increases, the eNodeB notifies the UE through downlink signaling, and after knowing the increase of the uplink serving AP, the UE decreases the uplink transmitting power value automatically; when the number of the uplink serving AP decreases, the eNodeB notifies the UE through the downlink signaling, and after the UE knows the decrease of the uplink serving AP, the UE increases the uplink transmitting power value automatically.

The eNodeB may notify the UE of the change information of the serving AP in the following way: The downlink signaling includes the change information directly, or the change information is included implicitly in other downlink signaling and transferred to the UE. The uplink transmitting power value adjusted automatically by the UE may be notified to the UE through the downlink signaling beforehand.

The uplink transmitting power adjustment value may be transferred by the eNodeB to the UE through multiple pieces of power control signaling, and after receiving the multiple pieces of control signaling, the UE executes indicators of all the power control signaling. The range of the power adjustment may be extended by using this method, therefore the power control method of the prior art can be used to support embodiments of the present invention.

For example, in an LTE system, uplink power control indicators may be transferred by using DCI (DCI, Downlink Control indicator) format 0 (the value range is [−4, −1, 1, 4] dB) and DCI format 3 (the value range is [−1, 0, 1, 3] dB); therefore, if the uplink power control adjustment value is 7 dB, an uplink power control indicator that uses DCI format 0 indicating the power adjustment is 4 dB and an uplink power control indicator that uses DCI format 3 indicating the power adjustment is 3 dB may be transferred simultaneously. After receiving the two indicators, the UE may adjust the uplink transmitting power by 7 dB.

In the fourth embodiment of the present invention, when the AP that sends downlink signaling to the UE is different from the uplink serving AP of the UE, corresponding processing is performed to ensure that the calculated uplink transmitting power matches the expected uplink transmitting power for uplink transmission, therefore normal uplink transmission is ensured. Further, the fourth embodiment of the present invention can extend the range of power control and ensure the uplink transmission performance when the uplink serving AP changes.

Persons skilled in the art should understand that part of the steps of the method in any embodiment of the present invention may be implemented by a program instructing relevant hardware. The program may be stored in a computer readable storage medium such as a Read Only Memory (ROM), a Random Access Memory (RAM), a magnetic disk, or a Compact Disk-Read Only Memory (CD-ROM).

Figure 6:
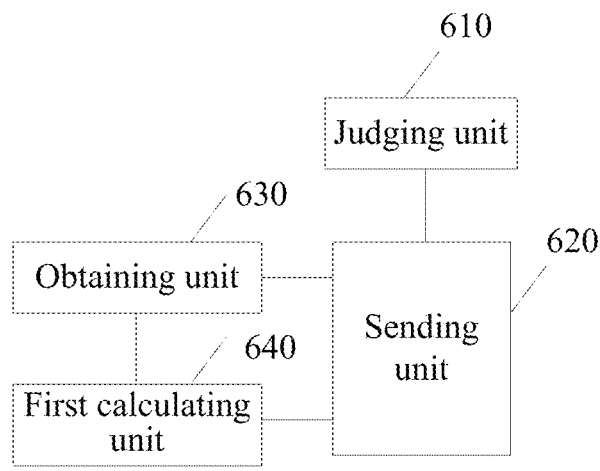
FIG. 6 is a schematic structural diagram of an apparatus for power control according to a fifth embodiment of the present invention.

FIG. 6 is a schematic structural diagram of an apparatus for power control according to the fifth embodiment of the present invention; the power control apparatus includes a judging unit 610 and a sending unit 620, where:

the judging unit 610 is configured to judge whether a downlink serving AP of a UE and an uplink serving AP of the UE is the same AP; and the sending unit 620 is configured to send downlink signaling to the UE when the judging unit 610 determines that the downlink serving AP of the UE is different from the uplink serving AP of the UE, so that the UE adjusts uplink transmitting power according to the downlink signaling.

Preferably, the apparatus may further include an obtaining unit 630, which is configured to obtain a parameter from at least one uplink serving AP of the UE. The parameter obtained from the uplink serving AP includes at least one of the following parameters:

PL measured between the AP and the UE by the uplink serving AP;

a cell-specific parameter of the uplink serving AP; and a UE-specific parameter determined by the uplink serving AP.

The apparatus may further include a first calculating unit 640, which is configured to calculate an uplink transmitting power adjustment value according to the parameter obtained by the obtaining unit 630; accordingly, the sending unit 620 is further configured to send information indicating the uplink transmitting power adjustment value to the UE by carrying the information in the downlink signaling.

The first calculating unit 640 calculates the uplink transmitting power adjustment according to the obtained parameters specifically in the following way:

obtaining the maximum value of a corresponding parameter obtained from the at least one uplink serving AP; or obtaining the minimum value of the corresponding parameters obtained from the at least one uplink serving AP; or obtaining the average value of the corresponding parameters obtained from the at least one uplink serving AP; or obtaining one of the corresponding parameters obtained from the at least one uplink serving AP.

It should be noted that the sending unit 620 is further configured to send at least one of the parameters obtained from the obtaining unit and the UE-specific parameter determined by the uplink serving AP, and a PL measurement indicator to the UE by carrying the parameter and the indicator in the downlink signaling. The downlink signaling further includes an ID of the uplink serving AP or information indicating the ID of the uplink serving AP.

In addition, the sending unit 620 is further configured to send the change information of the serving AP of the UE to the UE so that the UE modifies the range of uplink power control parameters according to the change information of the serving AP.

In addition, the obtaining unit 630 is further configured to obtain the change information of the serving AP of the UE and send the information to the sending unit 620.

The sending unit 620 is further configured to: send information including the mapping relationship between the change information of the serving AP of the UE and the uplink transmitting power of the UE beforehand; and when the serving AP of the UE changes, send the downlink signaling carrying the change information of the serving AP to the UE so that the UE adjusts the uplink transmitting power automatically according to the change information.

The sending unit 620 may send the downlink signaling to the UE through a broadcast channel or a downlink control channel. The sending unit 620 may also send the downlink signaling to the UE through the downlink serving AP of the UE.

Embodiments of the apparatus for power detection may be applied in related network devices, and the structure of the apparatus is described above and not further described here.

Figure 7:
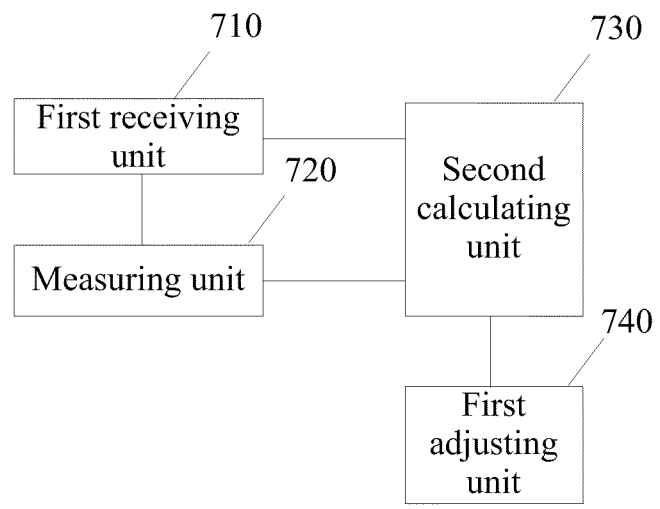
FIG. 7 is a schematic structural diagram of a UE according to a sixth embodiment of the present invention.

FIG. 7 is a schematic structural diagram of a UE according to the sixth embodiment of the present invention. The UE includes a first receiving unit 710, a measuring unit 720, a second calculating unit 730, and a first adjusting unit 740; where:

the first receiving unit 710 is configured to receive a PL measurement indicator and a parameter sent by a base station;

the measuring unit 720 is configured to measure a PL between the UE and at least one uplink serving AP of the UE according to the PL measurement indicator received by the first receiving unit 710;

the second calculating unit 730 is configured to calculate an uplink transmitting power adjustment value according to the measured PL and the parameters obtained from the base station; and the first adjusting unit 740 is configured to adjust uplink transmitting power according to the uplink transmitting power adjustment value calculated by the second calculating unit 730.

Figure 8:
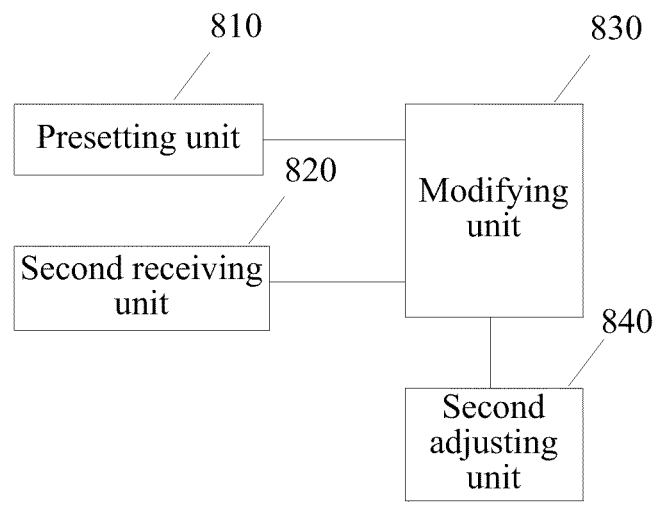
FIG. 8 is a schematic structural diagram of a UE according to a seventh embodiment of the present invention.

FIG. 8 is a schematic structural diagram of a UE according to the seventh embodiment of the present invention. The UE includes a presetting unit 810, a second receiving unit 820, a modifying unit 830, and a second adjusting unit 840; where:

the presetting unit 810 is configured to bind change information of a serving AP of the UE to a range of an uplink power control parameters of the UE beforehand; the second receiving unit 820 is configured to receive the change information of the serving AP of the UE and downlink signaling carrying information that indicates an uplink transmitting power adjustment value sent by a base station;

the modifying unit 830 is configured to modify the range of the uplink power control parameters according to the change information; and the second adjusting unit 840 is configured to adjust uplink transmitting power according to the uplink transmitting power adjustment value and the current range of the uplink power control parameters.

By using the method, apparatus, and network device for power control provided by the present invention, when the AP that sends downlink signaling to the UE is different from the uplink serving AP of the UE, corresponding processing is performed to ensure that the related parameters for calculating uplink transmitting power match uplink transmission, therefore normal uplink transmission is ensured.

It should be noted that the present invention is also applicable to a relay transmission system (that is, the AP herein may be replaced by a relay node) or other systems in which an uplink power control parameter do not match uplink transmission.

Detailed above are a method, an apparatus, and a network device for power control provided by the present invention. Although the principle and implementation of the present invention are described with reference to exemplary embodiments, the embodiments are only intended to help understand the solutions of the present invention. In addition, modification or variations may be made to the implementation and applicability of the present invention by persons skilled in the art. Therefore, the specification shall not be construed as a limitation on the present invention.

What is claimed is:

1. A method for power control, comprising:
    obtaining, by a base station, at least one parameter from at least one uplink serving access point (AP) of the UE;
    calculating, by the base station, an uplink transmitting power adjustment value according to the at least one parameter; and
    if an AP that sends a first downlink signaling to a User Equipment (UE) is not any one of the at least one uplink serving AP of the UE, sending, by the base station, a second downlink signaling to the UE, wherein the second downlink signaling comprises information indicating the uplink transmitting power adjustment value, wherein the uplink transmitting power adjustment value is used for the UE to adjust uplink transmitting power;
    wherein calculating the uplink transmitting power adjustment value according to the at least one parameter comprises:
        calculating, by the base station, the uplink transmitting power adjustment value according to a maximum value of the same parameter in the at least one parameter obtained from the at least one uplink serving AP; or
        calculating, by the base station, the uplink transmitting power adjustment value according to a minimum value of the same parameter in the at least one parameter obtained from the at least one uplink serving AP; or calculating, by the base station, the uplink transmitting power adjustment value according to an average value of the same parameter in the at least one parameter obtained from the at least one uplink serving AP; or calculating, by the base station, the uplink transmitting power adjustment value according to one value of the same parameter in the at least one parameter obtained from the at least one uplink serving AP.

2. The method according to claim 1, wherein calculating the uplink transmitting power adjustment value according to the at least one parameter comprises calculating, by the base station, the uplink transmitting power adjustment value according to a maximum value of the same parameter in the at least one parameter obtained from the at least one uplink serving AP.

3. The method according to claim 1, wherein calculating the uplink transmitting power adjustment value according to the at least one parameter comprises calculating, by the base station, the uplink transmitting power adjustment value according to a minimum value of the same parameter in the at least one parameter obtained from the at least one uplink serving AP.

4. The method according to claim 1, wherein calculating the uplink transmitting power adjustment value according to the at least one parameter comprises calculating, by the base station, the uplink transmitting power adjustment value according to an average value of the same parameter in the at least one parameter obtained from the at least one uplink serving AP.

5. The method according to claim 1, wherein calculating the uplink transmitting power adjustment value according to the at least one parameter comprises calculating, by the base station, the uplink transmitting power adjustment value according to one value of the same parameter in the at least one parameter obtained from the at least one uplink serving AP.

6. A method for power control, comprising:
obtaining, by a base station, at least one cell-specific parameter of at least one uplink serving access point (AP) and a user equipment (UE)-specific parameter determined by the at least one uplink serving AP from the at least one uplink serving AP of the UE; and if an AP that sends a first downlink signaling to a UE is not anyone of the at least one uplink serving AP of the UE, sending, by the base station, a second downlink signaling to the UE, so that the UE adjusts uplink transmitting power according to the second downlink signaling, wherein the second downlink signaling comprises the at least one of the cell-specific parameters of the at least one uplink serving AP, the UE-specific parameter determined by the at least one uplink serving AP and a Path Loss (PL) measurement indicator; and wherein the UE adjusts uplink transmitting power according to the second downlink signaling by:
receiving the PL measurement indicator;
measuring a PL between the UE and the at least one uplink serving AP of the UE according to the PL measurement indicator;
calculating an uplink transmitting power adjustment value according to the measured PL and the at least one of the cell-specific parameters of the at least one uplink serving AP and the UE-specific parameter determined by the at least one uplink serving AP obtained from the base station; and
adjusting the uplink transmitting power according to the uplink transmitting power adjustment value.

7. The method for power control according to claim 6, wherein the second downlink signaling further comprises an ID of the at least one uplink serving AP or information indicating the ID of the at least one uplink serving AP.

8. A method for power control, comprising:
obtaining, by a base station, at least one parameter from at least one uplink serving access point (AP) of the UE;
calculating, by the base station, an uplink transmitting power adjustment value according to the at least one parameter;
if an AP that sends a first downlink signaling to a User Equipment (UE) is not anyone of the at least one uplink serving AP of the UE, sending, by the base station, a second downlink signaling to the UE, wherein the second downlink signaling comprises information indicating the uplink transmitting power adjustment value, wherein the uplink transmitting power adjustment value is used for the UE to adjust uplink transmitting power;
binding, by the UE, change information of the at least one uplink serving AP of the UE to a range of value of an uplink power control parameter of the UE beforehand;
if the at least one uplink serving AP changes, sending with priority, by the base station, the change information of the at least one uplink serving AP of the UE to the UE, so that the UE modifies the range of value of the uplink power control parameter according to the change information of the serving AP; and
if the UE receives the second downlink signaling comprising the information indicating the uplink transmitting power adjustment value, adjusting, by the UE, the uplink transmitting power according to the information indicating uplink transmitting power adjustment value and a current range of value of the uplink power control parameter.

9. The method for power control according to claim 8, wherein:
the information indicating the uplink transmitting power adjustment value is indicated through Downlink Control Indicator (DCI) format of at least one uplink power control indicator.

* * * * *